(12) United States Patent
Kim (10) Patent No.: US 10,602,130 B2
(45) Date of Patent: Mar. 24, 2020

(54) IMAGE DISPLAY DEVICE FOR DISPLAYING COMPOSITE IMAGE

(71) Applicant: TOVIS CO., LTD., Incheon (KR)

(72) Inventor: Yong Beom Kim, Incheon (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 16/313,873

(22) PCT Filed: Jun. 20, 2017

(86) PCT No.: PCT/KR2017/006428
§ 371 (c)(1),
(2) Date: Dec. 27, 2018

(87) PCT Pub. No.: WO2018/004170
PCT Pub. Date: Jan. 4, 2018

(65) Prior Publication Data
US 2019/0149810 A1    May 16, 2019

(30) Foreign Application Priority Data

Jun. 28, 2016  (KR) .................. 10-2016-0081112

(51) Int. Cl.
*H04N 13/361* (2018.01)
*G02B 1/11* (2015.01)
*H04N 13/302* (2018.01)
*G09F 9/30* (2006.01)

(52) U.S. Cl.
CPC ............ *H04N 13/361* (2018.05); *G02B 1/11* (2013.01); *G09F 9/301* (2013.01); *H04N 13/302* (2018.05)

(58) Field of Classification Search
CPC .................................................. H04N 13/361
USPC ........................................................... 348/58
See application file for complete search history.

(56) References Cited

U.S. PATENT DOCUMENTS

2004/0246410 A1* 12/2004 Kim .................... G02F 1/13394
349/110
2011/0304716 A1  12/2011 Sato et al.

FOREIGN PATENT DOCUMENTS

| JP | 2006-285113 A | 10/2006 |
| JP | 2012-088647 A | 5/2012 |
| KR | 10-0134267 B1 | 4/1998 |
| KR | 10-2011-0136690 A | 12/2011 |
| KR | 10-2012-0069372 A | 6/2012 |

(Continued)

OTHER PUBLICATIONS

Reflection-Type display device and display method Tan Jifeng; Boe Technology Group Co LTD CN 104730768 (Year: 2015).*

(Continued)

*Primary Examiner* — Eileen M Adams
*Assistant Examiner* — Daniel T Tekle
(74) *Attorney, Agent, or Firm* — Revolution IP, PLLC (57) ABSTRACT

An image display device for displaying a composite image, includes a transparent first display panel located in front of eyes of viewers for displaying a first image and a second display panel disposed so as to be spaced apart from the first display panel for displaying a second image, the image display device being configured to display a composite image obtained by composing the first image displayed by the first display panel and the second image displayed by the second display panel, the composite image being viewed.

6 Claims, 8 Drawing Sheets

(56) References Cited

FOREIGN PATENT DOCUMENTS

KR          10-1371021  B1      3/2014

OTHER PUBLICATIONS

International Search Report for PCT/KR2017/006428 dated Sep. 21, 2017 from Korean Intellectual Property Office.

* cited by examiner

IMAGE DISPLAY DEVICE FOR DISPLAYING COMPOSITE IMAGE

TECHNICAL FIELD

The present invention relates to an image display device for displaying a composite image obtained by composing two images, the composite image being viewed.

BACKGROUND ART

In recent years, image display devices have been developed so as to display a three-dimensional image as well as a two-dimensional image.

An example of an image display device that is capable of displaying a three-dimensional image is disclosed in Korean Patent Application Publication No. 10-2012-0069372 entitled MULTILAYER DISPLAY DEVICE.

A conventional multilayer display device includes a first display panel for displaying a rear image, a first light source disposed at one surface of the first display panel for providing light, a second display panel disposed on the other surface of the first display panel for displaying a front image, and a second light source disposed on at least one surface of the second display panel for providing light that corresponds to the luminance of the first display panel.

In the conventional multilayer display device having the above construction, the image displayed by the first display panel and the image displayed by the second display panel overlap each other in order to provide a three-dimensional image to viewers.

In the conventional multilayer display device, however, the transmissivity of the display panels is less than 10%. The light source is additionally mounted between the first display panel and the second display panel, which overlap each other, such that the second display panel, which is located at the rear, has sufficient brightness to be clearly viewed. As a result, power consumption is excessive, and the light source is rapidly aged due to the generation of heat from the light source.

In addition, the luminance of the second display panel, which is disposed at the rear, is further increased by the light source mounted between the second display panel and the first display panel, whereby it is difficult to display a clear image.

DISCLOSURE

Technical Problem

Therefore, the present invention has been made in view of the above problems, and it is an object of the present invention to provide an image display device for displaying a composite image that is capable of providing a clear composite image without additionally providing a light source, that has reduced power consumption as the result of eliminating the provision of the light source, and that is capable of preventing the light source from being aged due to the generation of heat from the light source.

Technical Solution

In accordance with the present invention, the above and other objects can be accomplished by the provision of an image display device for displaying a composite image, the image display device including a transparent first display panel located in front of the eyes of viewers for displaying a first image and a second display panel disposed so as to be spaced apart from the first display panel for displaying a second image, the image display device being configured to display a composite image obtained by composing the first image displayed by the first display panel and the second image displayed by the second display panel, the composite image being viewed, wherein the first display panel includes pin holes, through which light is optically transmitted, formed in respective pixels, and the image display device further includes a light-blocking member for sealing a gap defined between the first display panel and the second display panel such that light is prevented from being transmitted through the gap in order to prevent the contrast ratio of the first display panel from being reduced due to the introduction of light into the gap between the first display panel and the second display panel from an outside.

Non-reflective treatment for reducing the reflectance of light may be performed on the surface of the light-blocking member that faces inwards between the first display panel and the second display panel.

The second display panel may include a non-reflective layer provided on the surface thereof that faces the first display panel for reducing the reflectance of light incident through the pin holes formed in the first display panel.

The non-reflective layer may be formed by applying non-reflective ink, by attaching a non-reflective sheet, or by performing non-reflective treatment on a color filter included in the second display panel.

The first display panel and the second display panel may be formed such that the size of one of the first display panel and the second display panel is smaller than the size of the other of the first display panel and the second display panel, and the light-blocking member may be provided to seal only a gap between the edge of the first display panel having a relatively small size and the second display panel or a gap between the edge of the second display panel having a relatively small size and the first display panel.

At least one of the first display panel or the second display panel may be curved.

Advantageous Effects

According to the present invention, the first display panel, in which the pin holes are formed so as to have high transmissivity, is disposed at the front, and the light-blocking member is provided between the first display panel and the second display panel in order to darken the gap between the first display panel and the second display panel, whereby it is possible to prevent a reduction in the contrast ratio of the first display panel. Furthermore, the non-reflective layer provided on the second display panel minimizes the reflection of light introduced through the first display panel in order to increase the contrast ratio of the first display panel, whereby it is possible to provide a clear composite image to viewers.

In addition, since the pin holes are formed in the first display panel in order to improve the transmissivity of the first display panel, a clear composite image is provided to viewers without the provision of an additional backlight unit, whereby it is possible to reduce power consumption. Furthermore, it is not necessary to excessively increase the intensity of radiation, whereby it is possible to prevent the backlight unit from being aged due to the deterioration of the backlight unit.

BEST MODE

Hereinafter, an embodiment of the present invention will be described with reference to the accompanying drawings.

First, an image display device 100 for displaying a composite image according to the present invention may be used as an image output means of, for example, a game console or digital public signage. In addition, the image display device may be used in various fields that require an image output means.

Figure 1:
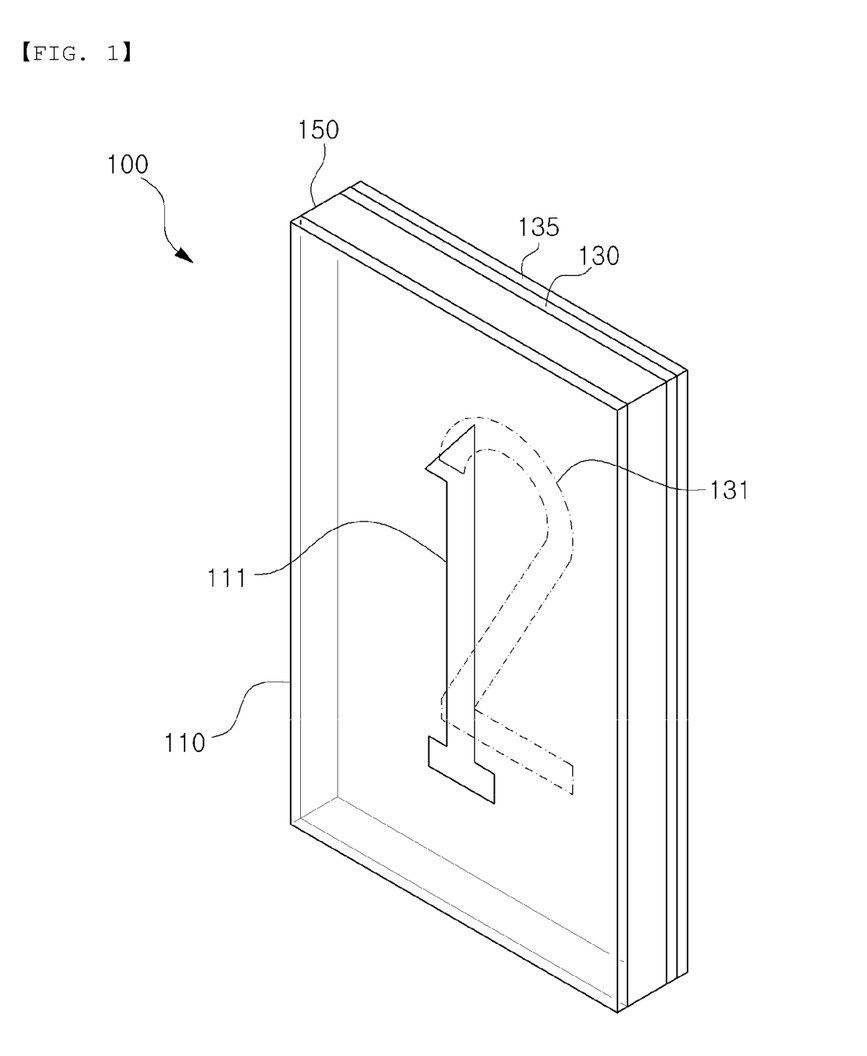
FIG. 1 is a perspective view showing an image display device for displaying a composite image according to an embodiment of the present invention.
Figure 2:
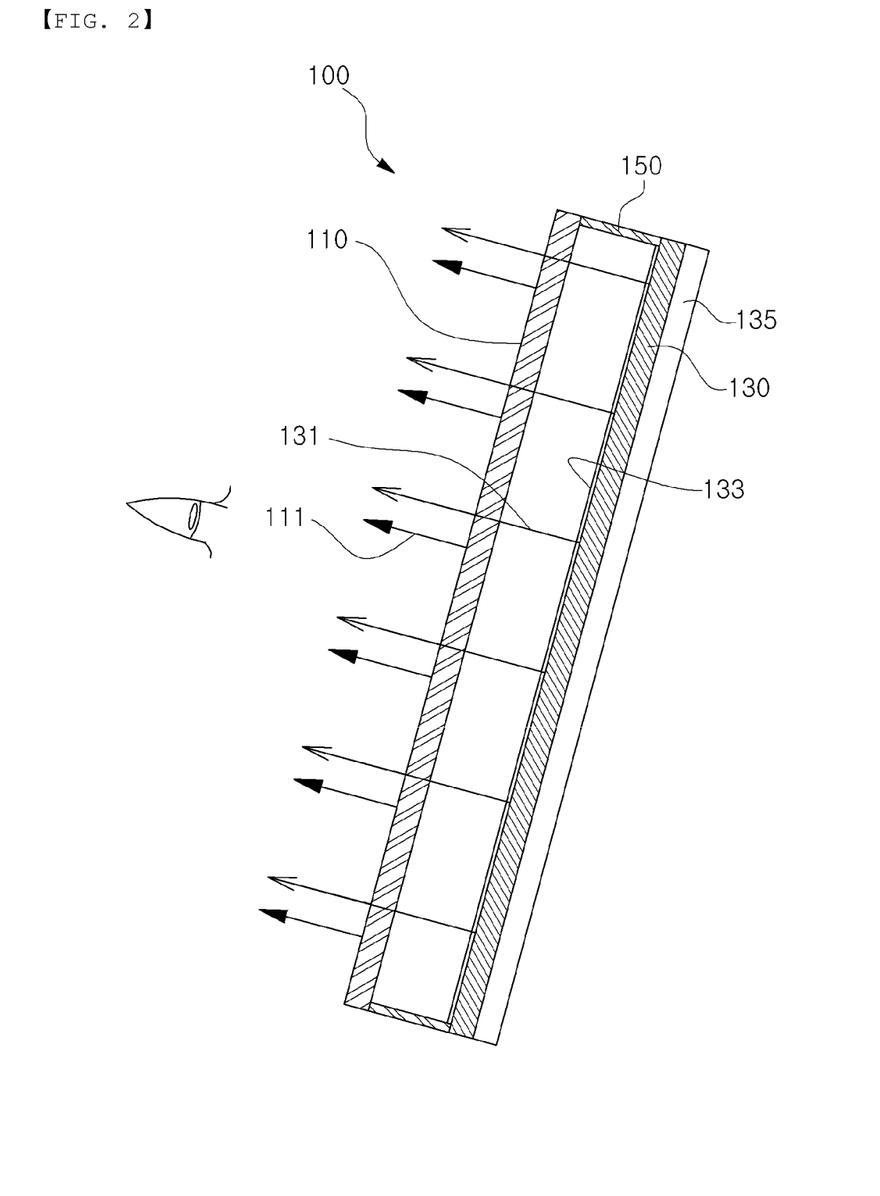
FIG. 2 is a side sectional view showing the image display device for displaying the composite image according to the embodiment of the present invention.

As shown in FIGS. 1 and 2, an image display device 100 for displaying a composite image according to an embodiment of the present invention may include a first display panel 110.

The first display panel 110 may be located in front of the eyes of viewers in order to display a first image 111.

Meanwhile, the first display panel 110 may be a transparent display panel, through which objects located at the rear thereof are seen.

Figure 3:
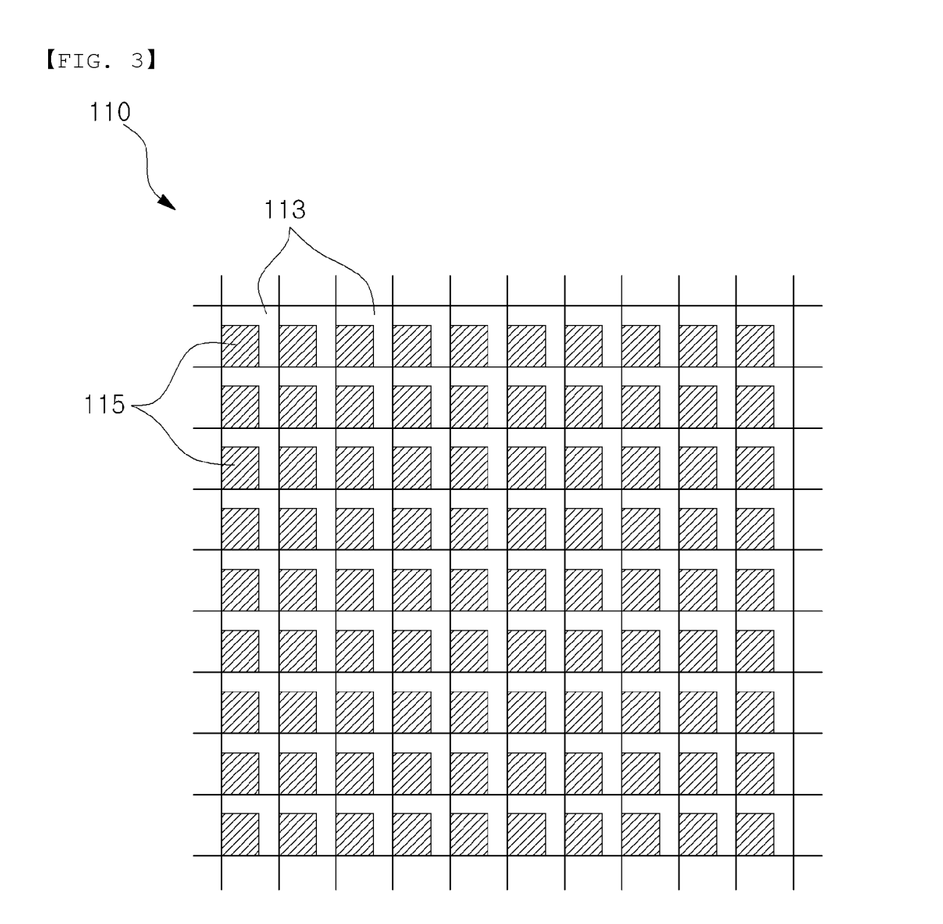
FIG. 3 is a schematic view showing pin holes formed in a first display panel of the image display device for displaying the composite image according to the embodiment of the present invention, some of which are shown at an enlarged scale.

In addition, as shown in FIG. 3, the first display panel 110, which is a transparent display panel, may be a transparent OLED configured such that pin holes 115, through which light is optically transmitted, are formed in respective pixels 113 in order to improve transparency.

Here, the first display panel 110 may be realized by a transparent OLED, a transparent LCD, or a transparent PDP. In the case in which the first display panel 110 is realized by an LCD or a PDP, the size of a pattern of a color filter in each pixel 113 may be reduced in order to form a corresponding pin hole 115.

In the present invention, each pixel 113 refers to a part partitioned by gate lines and signal lines that intersect each other (See FIG. 3).

Meanwhile, the pin holes 115, through which light is transmitted, are formed in the first display panel 110. As a result, the transmissivity (40 to 50%) of the first display panel 110 is higher than the transmissivity (20 to 30%) of a general transparent display panel. Consequently, it is possible for viewers to clearly view a second image 131 displayed by a second display panel 130, a description of which will follow. In addition, the brightness of a backlight unit 135 for providing the intensity of radiation necessary for the second display panel 130 may be minimized, whereby it is possible to reduce power consumption that is caused due to an increase in the intensity of radiation of the backlight unit 135.

As shown in FIGS. 1 and 2, the image display device 100 for displaying the composite image according to the embodiment of the present invention may include a second display panel 130.

The second display panel 130 may display a second image 131.

Meanwhile, the second display panel 130 is located at the rear of the first display panel 110 in order to display the second image 131. Consequently, a composite image obtained by composing the first image 111, which is displayed by the transparent first display panel 110, and the second image 131, which is displayed by the second display panel 130, the first image 111 and the second image 131 overlapping each other, may be provided to viewers.

The second display panel 130 may be disposed so as to be spaced apart from the first display panel 110 by a predetermined distance.

Since the first display panel 110 and the second display panel 130 are disposed so as to be spaced apart from each other, viewers may view a three-dimensional composite image having a sensation of visual space due to the distance difference between the first image 111 and the second image 131.

For example, the first display panel 110 may display the first image 111 as a main image and the second display panel 130 may display the second image 131 as a background image such that viewers can feel a sensation of visual space due to the distance difference between the main image and the background image. Alternatively, the first image 111 and the second image 131 displayed respectively by the first display panel 110 and the second display panel 130 may be displayed as a three-dimensional image such that viewers can view a three-dimensional composite image.

Meanwhile, the second display panel 130 may include a backlight unit 135, which is a light source for providing light to the second display panel 130.

The backlight unit 135 may be a direct type backlight unit, in which a light source is disposed throughout the rear of the second display panel 130, or may be an edge type backlight unit, in which a light source is disposed along the edge of the second display panel 130.

The second display panel 130 may include a non-reflective layer 133.

Figure 4:
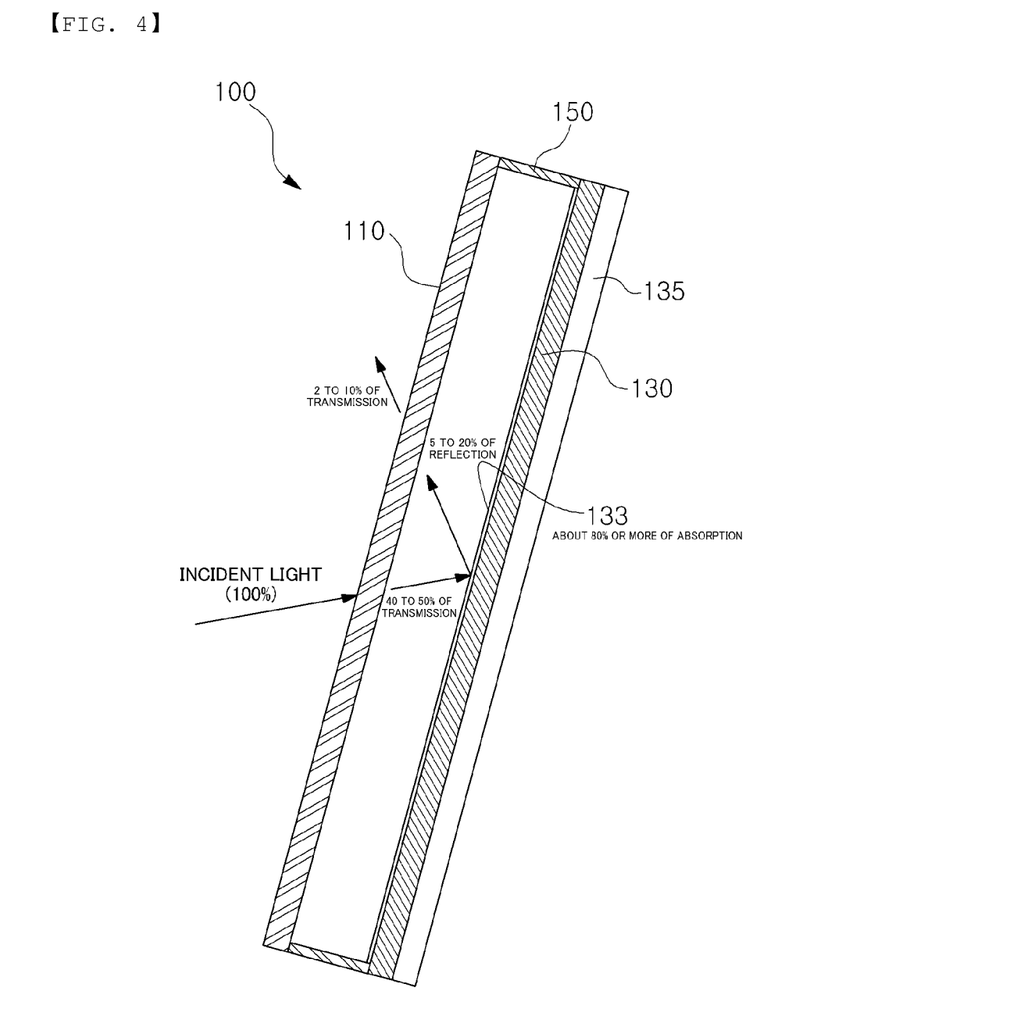
FIG. 4 is view illustrating a non-reflective layer of a second display panel of the image display device for displaying the composite image according to the embodiment of the present invention.

The non-reflective layer 133 may be provided on the surface of the second display panel 130 that faces the first display panel 110 in order to reduce the reflectance of light incident through the pin holes 115 formed in the first display panel 110, whereby it is possible to increase the contrast ratio of the first display panel 110.

For example, in the case in which 40 to 50% of the light is transmitted through the pin holes 115 formed in the first display panel 110, as shown in FIG. 4, the non-reflective layer 133 of the second display panel 130 does not totally reflect the light but reflects 5 to 20% of the light (absorbs 80% of the light). Consequently, the reflectance of the light is minimized, whereby it is possible to increase the contrast ratio of the first display panel 110.

At this time, even in the case in which the amount of light that is introduced through the first display panel 110, reflected by the second display panel 130, and forwarded to the first display panel 110 is reduced by only about 1%, it is possible to increase the contrast ratio of the first display panel 110 by about 100 lm.

Meanwhile, the non-reflective layer 133 may be realized by applying non-reflective ink to the second display panel 130 or by attaching a non-reflective sheet to the second display panel 130. Alternatively, the non-reflective layer 133 may be realized by performing non-reflective treatment on a color filter board included in the second display panel 130, for example, by coloring the color filter board with black.

Figure 7:
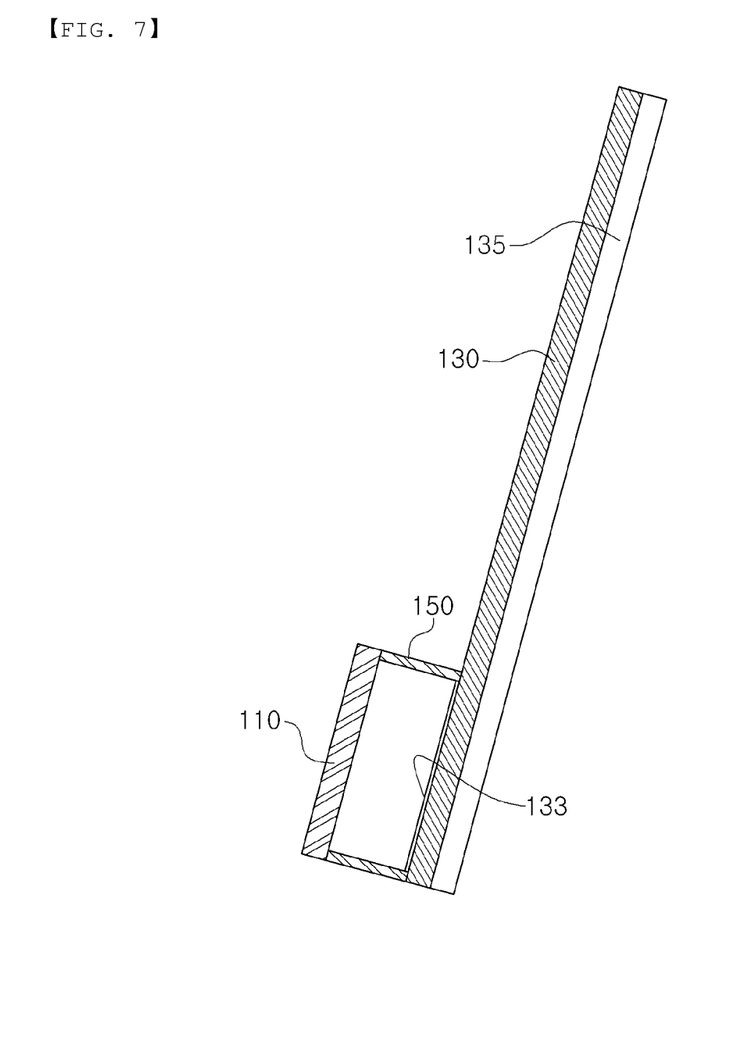
FIG. 7 is a side view showing the image display device for displaying the composite image according to the embodiment of the present invention, illustratively showing that the first display panel is formed such that the size of the first display panel is smaller than that of the second display panel.

In the case in which the first display panel 110 is formed such that the size of the first display panel 110 is smaller than that of the second display panel 130, the non-reflective layer 133 may be formed at only the portion of the second display panel 130 that corresponds to the first display panel 110.

As shown in FIGS. 1 and 2, the image display device 100 for displaying the composite image according to the embodiment of the present invention may include a light-blocking member 150.

The light-blocking member 150 may surround a gap defined between the edges of the first display panel 110 and the second display panel 130 in order to prevent light from being introduced into the gap defined between the first display panel 110 and the second display panel 130.

Meanwhile, the light-blocking member 150 may be formed to have the shape of a cover that seals only the gap between the edges of the first display panel 110 and the second display panel 130, to have the shape of a cover that seals the gap between the first display panel 110 and the second display panel 130 and the edge of the second display panel 130 excluding the edge of the first display panel 110, or to have the shape of any of various structures that seal the gap between the first display panel 110 and the second display panel 130.

The light-blocking member 150 may minimize the amount of light that is introduced into the gap between the first display panel 110 and the second display panel 130 in order to increase the contrast ratio of the first display panel 110. Non-reflective treatment may be performed on the inner surface of the light-blocking member 150 in order to reduce the reflectance of light.

Here, the non-reflective treatment may be performed by applying non-reflective ink to the light-blocking member 150, by attaching a non-reflective sheet to the light-blocking member 150, or by forming the light-blocking member 150 using a non-reflective material.

In the case in which the first display panel 110 is formed such that the size of the first display panel 110 is smaller than that of the second display panel 130, the light-blocking member 150 may be provided in order to seal a gap between the edge of the first display panel 110 and the portion of the second display panel 130 that overlaps the first display panel 110.

Figure 8:
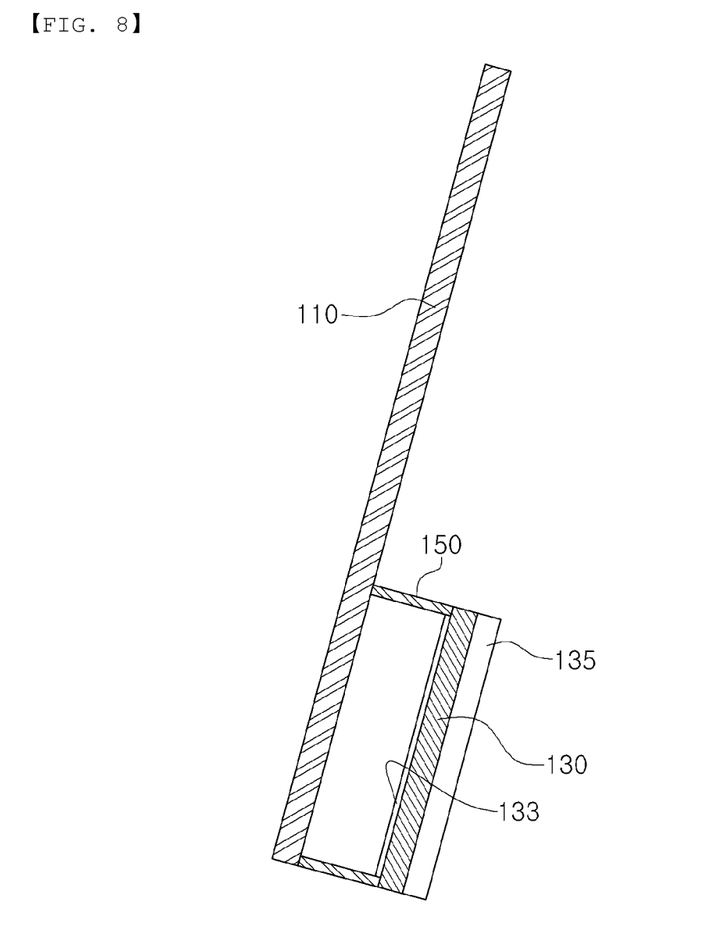
FIG. 8 is a side view showing the image display device for displaying the composite image according to the embodiment of the present invention, illustratively showing that the second display panel is formed such that the size of the second display panel is smaller than that of the first display panel.

On the other hand, in the case in which the second display panel 130 is formed such that the size of the second display panel 130 is smaller than that of the first display panel 110, the light-blocking member 150 may be provided in order to seal a gap between the edge of the second display panel 130 and the portion of the first display panel 110 that overlaps the second display panel 130.

Hereinafter, the operation and effects between the respective components of the image display device described above will be described.

In the image display device 100 for displaying the composite image according to the embodiment of the present invention, the transparent first display panel 110, which has the pin holes 115 formed in the respective pixels 113, is disposed in front of the eyes of viewers, and the second display panel 130, which is a general display panel, is disposed at the rear of the first display panel 110 so as to be spaced apart from the first display panel 110.

The light-blocking member 150 is mounted in the gap between the first display panel 110 and the second display panel 130 in order to prevent the introduction of light.

Meanwhile, the non-reflective layer 133 is provided on the surface of the second display panel 130 that faces the first display panel 110.

Figure 5:
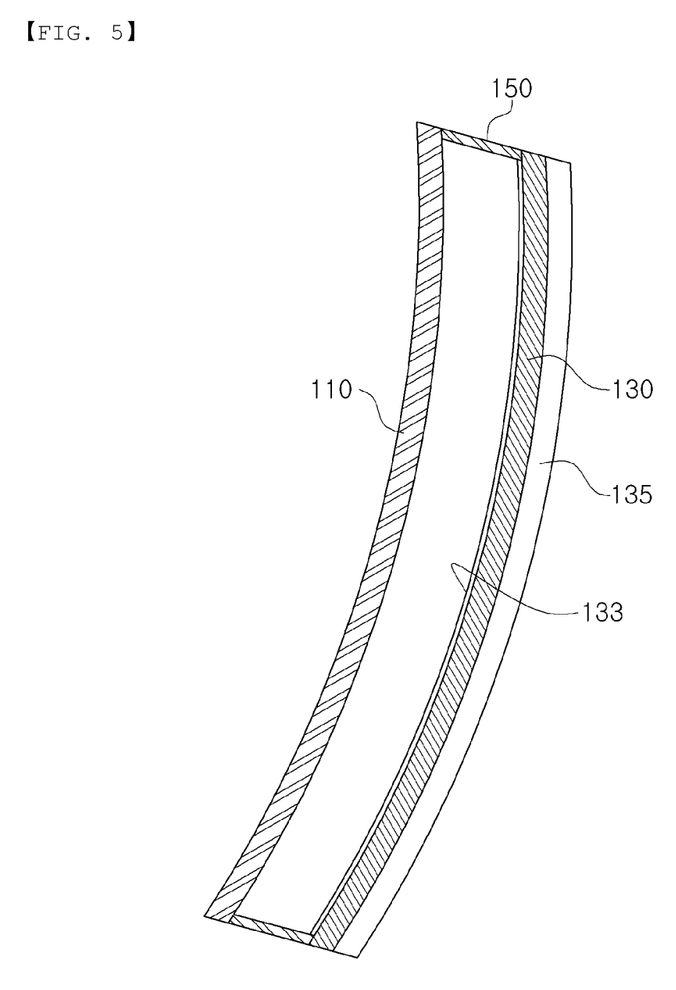
FIG. 5 is a side view showing the image display device for displaying the composite image according to the embodiment of the present invention, illustratively showing that the first display panel and the second display panel are formed so as to have a curved shape.
Figure 6:
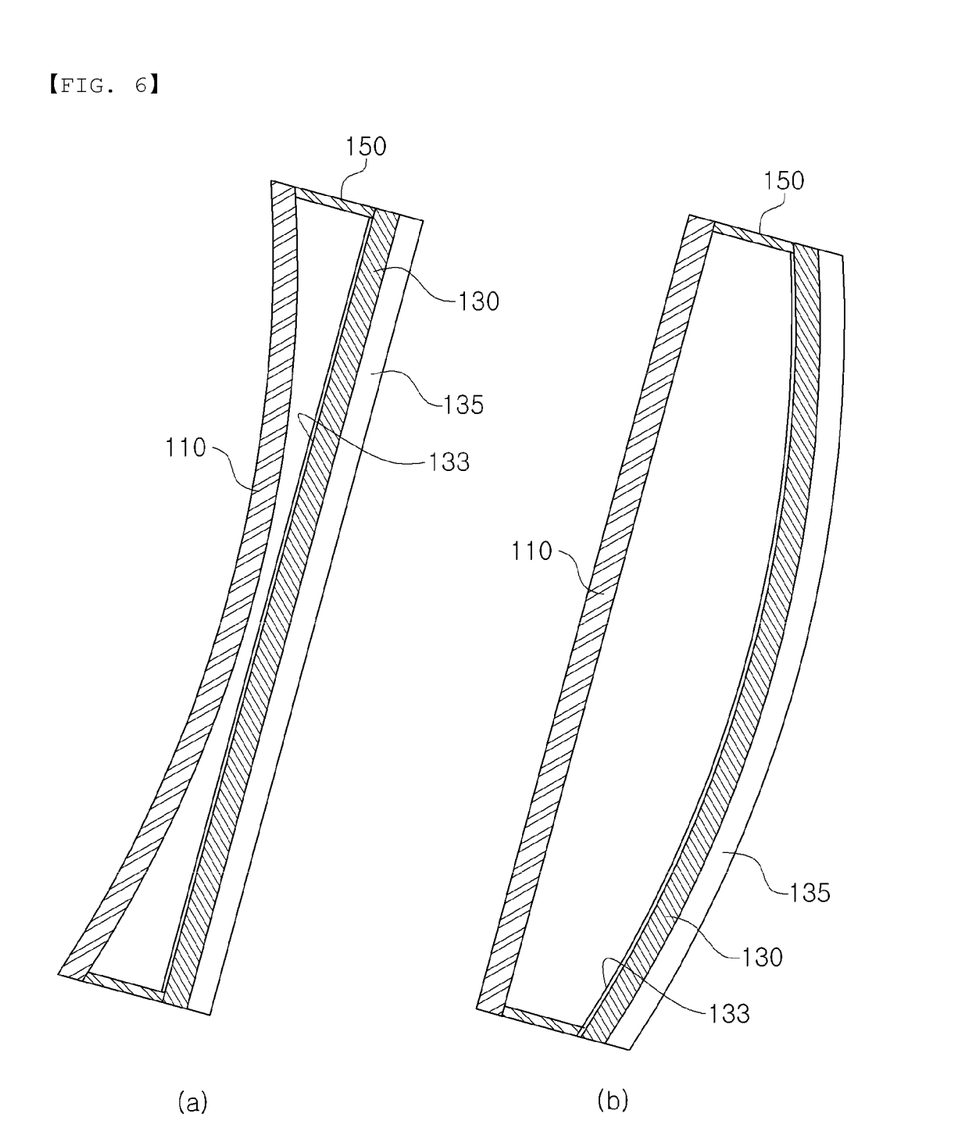
FIG. 6 is a side view showing the image display device for displaying the composite image according to the embodiment of the present invention, wherein FIG. 6(*a*) illustratively shows that the first display panel is formed so as to have a curved shape and FIG. 6(*b*) illustratively shows that the second display panel is formed so as to have a curved shape.

As shown in FIG. 5, the first display panel 110 and the second display panel 130 may be curved so as to have the same curvature or different curvatures in the same direction. Alternatively, as shown in FIG. 6(a) or 6(b), only one of the first display panel 110 and the second display panel 130 may be curved.

In addition, as shown in FIG. 7, the first display panel 110 may be formed such that the size of the first display panel 110 is smaller than that of the second display panel 130, in which case viewers can view a composite image through only a portion of the display panel.

Alternatively, as shown in FIG. 8, the second display panel 130 may be formed such that the size of the second display panel 130 is smaller than that of the first display panel 110, in which case viewers can view a composite image through only a portion of the display panel.

In the image display device 100 for displaying the composite image according to the embodiment of the present invention constructed as described above, the first display panel 110 displays the first image 111, and the second display panel 130 displays the second image 131. The second image 131, which is displayed by the second display panel 130, is transmitted through the pin holes 115 formed in the first display panel 110 such that viewers can view a composite image obtained by composing the first image 111 and the second image 131.

The light-blocking member 150 surrounds the edges of the first display panel 110 and the second display panel 130 in order to darken the gap between the first display panel 110 and the second display panel 130, whereby it is possible to prevent the contrast ratio of the first display panel 110 from being reduced due to the introduction of light.

In addition, light that is transmitted toward the second display panel 130 through the pin holes 115 formed in the first display panel 110 is maximally prevented from being reflected by the non-reflective layer 133 formed on the second display panel 130, whereby it is possible to reduce the contrast ratio of the first display panel 110.

In the image display device 100 for displaying the composite image according to the embodiment of the present invention, therefore, the light-blocking member 150 for preventing the introduction of light is mounted, and the non-reflective layer 133 for minimizing the reflectance of light is formed on the second display panel 130. Consequently, it is possible to prevent the contrast ratio of the first display panel 110 from being reduced due to the transmission of light such that a clear composite image can be provided to viewers.

In addition, the pin holes 115 for improving transmissivity are formed in the first display panel 110, whereby it is possible to minimize the brightness necessary in order for the second display panel 130 to display an image. Consequently, the intensity of radiation of the backlight unit 135 is reduced, whereby it is possible to minimize power consumption and to minimize the amount of heat that is generated from the backlight unit 135 and deterioration of the backlight unit 135.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

DESCRIPTION OF REFERENCE NUMERALS

- 100: Image display device for displaying composite image
- 110: First display panel
- 111: First image
- 113: Pixels
- 115: Pin holes
- 130: Second display panel
- 131: Second image
- 113: Non-reflective layer
- 135: Backlight unit
- 150: Light-blocking member

INDUSTRIAL APPLICABILITY

The present invention is applicable to various display fields that use display devices, such as a game console, digital signage, and a monitor.

The invention claimed is:

1. An image display device for displaying a composite image, the image display device comprising a transparent first display panel located in front of eyes of viewers for displaying a first image and a second display panel disposed so as to be spaced apart from the first display panel for displaying a second image, the image display device being configured to display a composite image obtained by composing the first image displayed by the first display panel and the second image displayed by the second display panel, the composite image being viewed, wherein the first display panel comprises pin holes, through which light is optically transmitted, formed in respective pixels, and the image display device further comprises a light-blocking member for sealing a gap defined between the first display panel and the second display panel such that light is prevented from being transmitted through the gap in order to prevent a contrast ratio of the first display panel from being reduced due to introduction of light into the gap between the first display panel and the second display panel from an outside.

2. The image display device according to claim 1, wherein non-reflective treatment for reducing reflectance of light is performed on a surface of the light-blocking member that faces inwards between the first display panel and the second display panel.

3. The image display device according to claim 1, wherein the second display panel comprises a non-reflective layer provided on a surface thereof that faces the first display panel for reducing reflectance of light incident through the pin holes formed in the first display panel.

4. The image display device according to claim 3, wherein the non-reflective layer is formed by applying non-reflective ink, by attaching a non-reflective sheet, or by performing non-reflective treatment on a color filter included in the second display panel.

5. The image display device according to claim 1, wherein
the first display panel and the second display panel are formed such that a size of one of the first display panel and the second display panel is smaller than a size of the other of the first display panel and the second display panel, and
the light-blocking member is provided to seal only a gap between an edge of the first display panel having a relatively small size and the second display panel or a gap between an edge of the second display panel having a relatively small size and the first display panel.

6. The image display device according to claim 1, wherein at least one of the first display panel or the second display panel is curved.

* * * * *